(12) United States Patent
Huang et al.

(10) Patent No.: US 8,045,820 B2
(45) Date of Patent: Oct. 25, 2011

(54) SYSTEM AND METHOD FOR EDGE DIRECTION DETECTION FOR SPATIAL DEINTERLACE

(75) Inventors: Ling Shiou Huang, Tainan County (TW); Sheng Chun Niu, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1055 days.

(21) Appl. No.: 11/835,332

(22) Filed: Aug. 7, 2007

(65) Prior Publication Data

US 2009/0041374 A1 Feb. 12, 2009

(51) Int. Cl.
*G05K 9/00* (2006.01)
*G06T 5/00* (2006.01)
(52) U.S. Cl. .................. 382/261; 382/263; 382/300
(58) Field of Classification Search .............. None
See application file for complete search history.

(56) References Cited

U.S. PATENT DOCUMENTS

| 6,262,773 | B1 | 7/2001 | Westerman | |
|---|---|---|---|---|
| 6,614,484 | B1 | 9/2003 | Lim et al. | |
| 6,965,705 | B1 | 11/2005 | Ma et al. | |
| 7,502,529 | B1 * | 3/2009 | Ma et al. | 382/300 |
| 2003/0076447 | A1 * | 4/2003 | Wang et al. | 348/571 |
| 2005/0068334 | A1 * | 3/2005 | Chang et al. | 345/617 |
| 2005/0073607 | A1 | 4/2005 | Ji et al. | |
| 2007/0269113 | A1 * | 11/2007 | Chao | 382/199 |
| 2008/0024658 | A1 * | 1/2008 | Wang et al. | 348/448 |

FOREIGN PATENT DOCUMENTS

TW 1240572 9/2005

OTHER PUBLICATIONS

Taiwanese Notice of Allowance dated Jun. 27, 2011 for 096134330, which is a corresponding Taiwanese application, that cites TW 1240572, US 2005/0073607A1, US 6965705B1, US 6614484B1, and US 6262773B1, 4 pages total.

* cited by examiner

*Primary Examiner* — Brian Werner

(74) *Attorney, Agent, or Firm* — WPAT, P.C.; Anthony King

(57) ABSTRACT

The system for edge direction detection for spatial deinterlace comprises an ignored region detector and an edge direction detection unit. The ignored region detector is configured to receive a first type field of a video frame and to define a search region based on the first type field. The edge direction detection unit is configured to select an edge direction within the search region. The edge direction is associated with an interpolated pixel located on one of a plurality of second type lines of a second type field, where the search region is smaller than the first type field.

7 Claims, 2 Drawing Sheets

SYSTEM AND METHOD FOR EDGE DIRECTION DETECTION FOR SPATIAL DEINTERLACE

BACKGROUND OF THE INVENTION

1. Field of the Invention

The present invention relates to a system and method for spatial deinterlace, and more particularly to a system and method for edge direction detection for spatial deinterlace.

2. Description of the Related Art

Deinterlacing is a process of converting interlaced video into a non-interlaced form. However, deinterlacing will produce some image degradation since it ideally requires "temporal interpolation," which involves guessing the movement of every object in the image and applying motion correction to every object. Interlaced display draws only half of the lines on the screen for each frame, that is, odd lines or even lines alternatively. When video is displayed on a display that can support so high a refresh rate that flickers are not perceivable, interlaced video can be deinterlaced for better viewing. Likewise, when a display must draw the entire screen each time, the video signal must be deinterlaced before it is shown. Right now, all displays except for CRT screens require deinterlace.

One of the popular methods for deinterlace is field combination deinterlacing, which requires interpolation between different fields. In many situations, the interpolation step is done by prediction based on the current field. For example, it is common to determine the direction of edges on the basis of spatial information of the odd field (line 1, line 3, line 5, etc.), and then interpolates data in even lines, such as line 4 according to the edge direction. The display quality of the interpolation partly depends on the search range for the prediction of the edge direction. If the search range is too broad, the determination will be interfered with, and some undesired noises occur. If the search range is too narrow, the determination will probably be wrong.

Because the edge direction detection for spatial deinterlace obviously affects the quality of the display, providing a suitable system and method to process the detection is a very important issue.

SUMMARY OF THE INVENTION

The method for edge direction detection for spatial deinterlace according to one embodiment of the present invention comprises the steps of: providing a first type field comprising a plurality of first type lines of a video frame; providing a second type field comprising a plurality of second type lines of the video frame; determining at least one ignored region in the first type field, wherein the at least one ignored region is classified as a smooth region type and a vertical edge type; defining a search region by excluding the at least one ignored region from the first type field; and detecting an edge direction within the search region, the edge direction being associated with an interpolated pixel located in one of the second type lines.

The system for edge direction detection for spatial deinterlace according to one embodiment of the present invention comprises an ignored region detector and an edge direction detection unit. The ignored region detector is configured to receive a first type field of a video frame and to define a search region based on the first type field. The edge direction detection unit is configured to select an edge direction within the search region. The edge direction is associated with an interpolated pixel located on one of a plurality of second type lines of a second type field, where the search region is smaller than the first type field.

BRIEF DESCRIPTION OF THE DRAWINGS

The invention will be described according to the appended drawings in which.

PREFERRED EMBODIMENT OF THE PRESENT INVENTION

Figure 1:
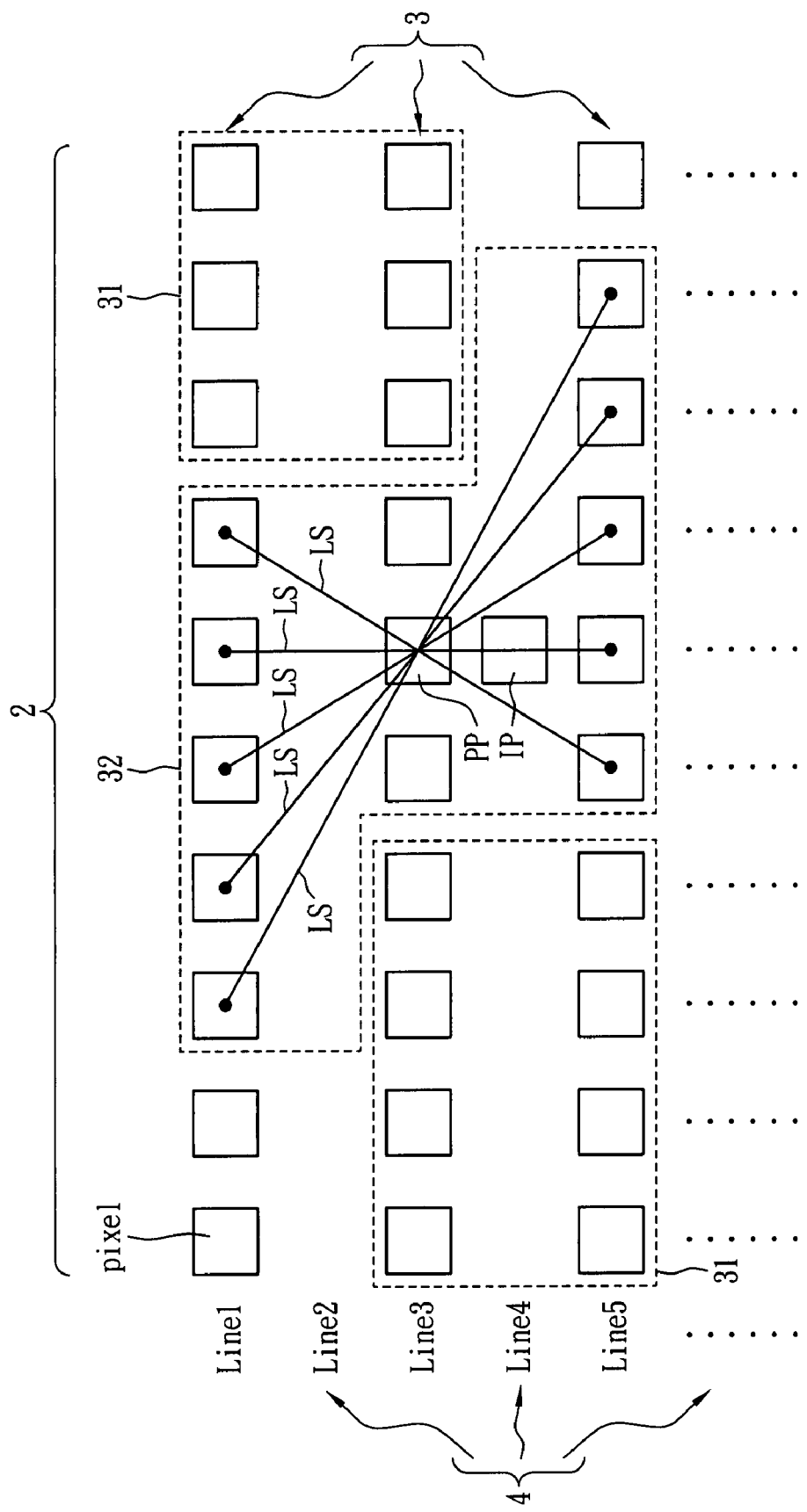
FIG. 1 exemplifies the search region in accordance with an embodiment of the present invention.

FIG. 1 exemplifies the search region in accordance with an embodiment of the present invention. A video frame 2 has a first type field 3 and a second type field 4. The first type field 3 includes a plurality of first type lines, such as lines 1, 3, 5, etc. The second type field 4 includes a plurality of second type lines, such as lines 2, 4, 6, etc. The first step of this embodiment is to determine where a smooth or vertical edge is, if any. A way for determining the smooth region is, first, to calculate the difference of the maximal value and the minimal value among pixels of a specific number, such as nine adjacent pixels. And then a comparison between the difference and a threshold value is made to determine if this comparison region is a desirable smooth region. A way for determining the vertical edge is comparing a horizontal difference with a vertical difference of the nine adjacent pixels, and then a vertical edge is regarded to exist if the horizontal difference is larger than the vertical difference multiplied by a weighting value. The smooth or vertical edge, if any, is defined as ignored regions 31.

After the smooth or vertical edge, if any, is located, the original search region excludes the ignored region 31 from the first type field 3 to form a dynamic search region 32, which has edges passing only the non-ignored region. For example, only five edges are in the dynamic search region 32. Thereafter, a specific edge direction within the dynamic search region 32 is detected. The specific edge direction is associated with an interpolated pixel IP located on one of a plurality of second type lines of the second type field 4, such as line 4 in FIG. 1.

The step of detecting the edge direction within the dynamic search region 32 is to first assign one of the first type lines closest to the interpolated pixel IP to be a primary line, such as line 3. Next, a first and a second auxiliary line, such as lines 1 and 5, which are also selected from the first type field 3 are located on opposite sides of the primary line. Thereafter, a pivoting pixel PP, which is next to and above the interpolated pixel IP, is chosen on the primary line. A plurality of line segments LS, each of which passes the pivoting pixel and has one end located on one pixel of the first auxiliary line and the other end on another pixel of the second auxiliary line, are drawn. However, only one of the above line segments is selected to be the edge direction. For example, the line segment has minimum deference between its one pixel of the first auxiliary line and the other of the second auxiliary line determines the edge direction.

Figure 2:
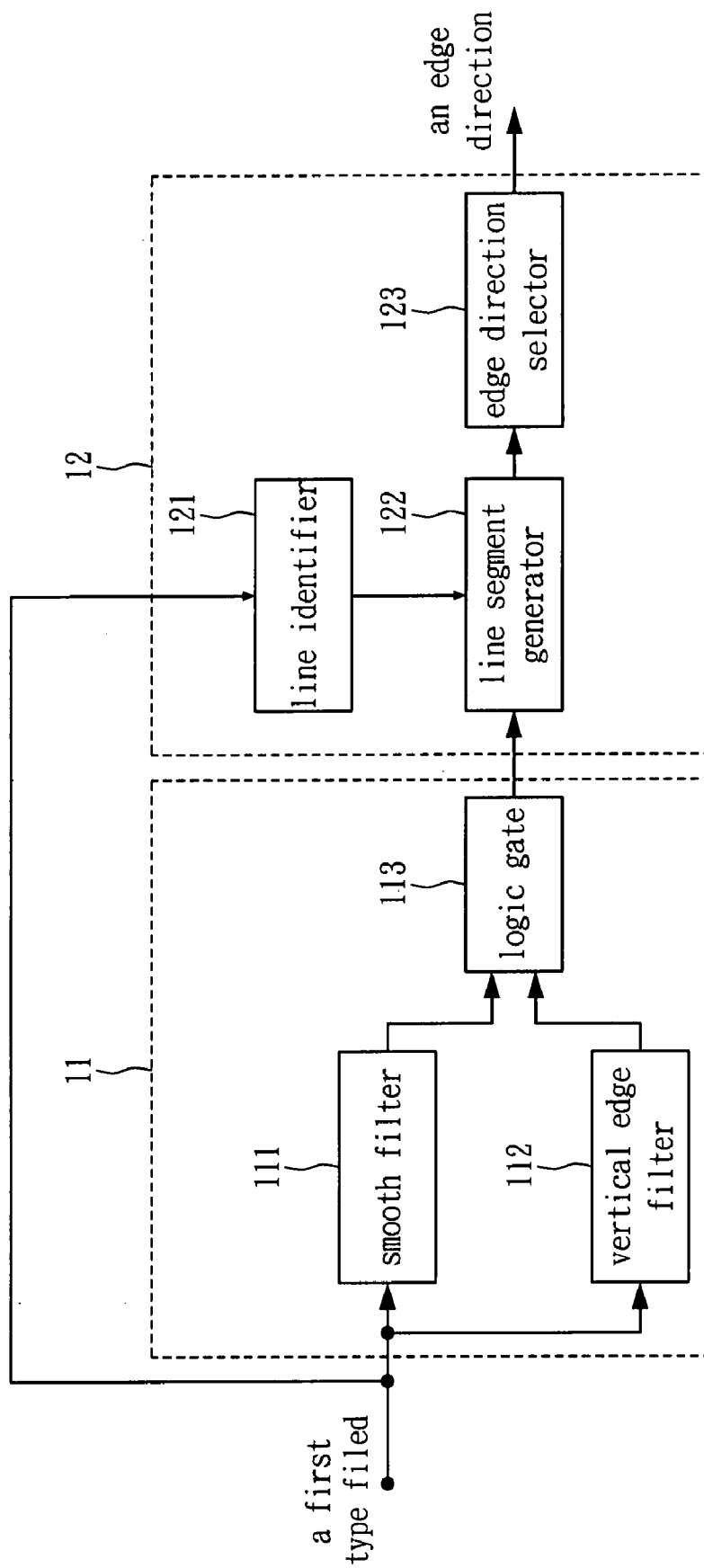
FIG. 2 shows a system in accordance with one embodiment of the present invention.

FIG. 2 shows a system in accordance with one embodiment of the present invention. The system for edge direction detection for spatial deinterlace comprises an ignored region detector 11 and an edge direction detection unit 12. The ignored region detector 11 is configured to receive a first type field of a video frame and to define a search region based on the first type field. As mentioned above, the ignored region includes regions that appear smooth and have vertical edges. The edge direction detection unit 12 is configured to select an edge direction within the search region. The edge direction is associated with an interpolated pixel located on one of a plurality of second type lines of a second type field. It is common practice that the search region is smaller than that of the first type field.

The ignored region detector 11 comprises a smooth filter 111, a vertical edge filter 112 and a logic gate 113. The smooth filter 111 is configured to define at least one smooth region in the first type field. As mentioned above, the smooth filter 111 can be made by calculating the difference of the maximal value and the minimal value among pixels of a specific number. The vertical edge filter 112 is configured to define at least one vertical edge in the first type field. As mentioned above, the vertical edge filter 112 can be made by calculating if a horizontal difference is larger than a vertical difference multiplied by a threshold value. The logic gate 113 is configured to define the search region by excluding the at least one smooth region and the at least one vertical edge from the first type field. The edge direction detection unit 12 comprises a line identifier 121, a line segment generator 122 and an edge direction selector 123. The line identifier 121 is configured to select a primary line and first and second auxiliary lines from the first type field 3. The line segment generator 122 is configured to form a plurality of line segments based on the primary line and the first and second auxiliary lines, such as the five LS lines shown in FIG. 1. The edge direction selector 123 is configured to select the edge direction from the line segments, such as the straight one which passes PP and IP in FIG. 1.

The embodiments of the present invention dynamically adjust the search region of edge directions on the basis of exclusion from the smooth and vertical edges. In contrast to prior arts, the embodiments of the present invention keep the search region in a suitable size. Unlike prior arts with oversize or undersize search region, the present invention can avoid generating noises, and at the same time locate a correct edge direction.

The above-described embodiments of the present invention are intended to be illustrative only. Numerous alternative embodiments may be devised by persons skilled in the art without departing from the scope of the following claims.

What is claimed is:

1. A method for edge direction detection for spatial deinterlace, comprising the steps of:
   providing a first type field comprising a plurality of first type lines of a video frame;
   providing a second type field comprising a plurality of second type lines of the video frame;
   determining at least one ignored region in the first type field, wherein the at least one ignored region is classified as a smooth region type and a vertical edge type;
   defining a search region by excluding the at least one ignored region from the first type field; and
   detecting an edge direction within the search region, the edge direction being associated with an interpolated pixel located in one of the second type lines;
   wherein the step of determining at least one ignored region in the first type field comprises the step of:
   comparing a horizontal difference with a vertical difference among pixels of a specific number.

2. The method for edge direction detection for spatial deinterlace of claim 1, wherein the step of detecting the edge direction within the search region comprises the steps of:
   assigning one of the first type lines closest to the interpolated pixel to be a primary line;
   providing first and second auxiliary lines located on opposite sides of the primary line, wherein the first and the second auxiliary lines are selected from the first type lines;
   forming a plurality of line segments passing a pivoting pixel on the primary line, the pivoting pixel being next to the interpolated pixel, wherein each line segment has one end located on one pixel of the first auxiliary line and the other end on another pixel of the second auxiliary lines; and
   selecting one of the line segments to be the edge direction.

3. The method for edge direction detection for spatial deinterlace of claim 2, wherein the primary line is located above the interpolated pixel.

4. The method for edge direction detection for spatial deinterlace of claim 1, wherein the step of determining at least one ignored region in the first type field comprises the steps of:
   calculating a difference of the maximal value and the minimal value among pixels of a specific number; and
   comparing the difference with a threshold value.

5. A system for edge direction detection for spatial deinterlace, comprising:
   an ignored region detector configured to receive a first type field of a video frame and to define a search region based on the first type field; and
   an edge direction detection unit configured to select an edge direction within the search region, the edge direction being associated with an interpolated pixel located on one of a plurality of second type lines of a second type field;
   wherein the search region is smaller than the first type field;
   wherein the ignored region detector determines an ignored region by comparing a horizontal difference with a vertical difference among pixels of a specific number.

6. The system for edge direction detection for spatial deinterlace of claim 5, wherein the ignored region detector comprises:
   a smooth filter configured to define at least one smooth region in the first type field;
   a vertical edge filter configured to define at least one vertical edge in the first type field; and
   a logic gate configured to define the search region by excluding the at least one smooth region and the at least one vertical edge from the first type field.

7. The system for edge direction detection for spatial deinterlace of claim 5, wherein the edge direction detection unit comprises:
   a line identifier configured to select a primary line and first and second auxiliary lines from the first type lines;
   a line segment generator configured to form a plurality of line segments based on the primary line and the first and the second auxiliary lines; and
   an edge direction selector configured to select the edge direction from the line segments.

* * * * *